United States Patent
Watanabe et al.

(10) Patent No.: US 9,342,174 B2
(45) Date of Patent: May 17, 2016

(54) ELECTRONIC DEVICE

(71) Applicant: Sharp Kabushiki Kaisha, Osaka-shi, Osaka (JP)

(72) Inventors: Hisashi Watanabe, Osaka (JP); Yohzoh Narutaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/377,530

(22) PCT Filed: Feb. 6, 2013

(86) PCT No.: PCT/JP2013/052719
§ 371 (c)(1),
(2) Date: Aug. 8, 2014

(87) PCT Pub. No.: WO2013/118769
PCT Pub. Date: Aug. 15, 2013

(65) Prior Publication Data
US 2015/0022475 A1  Jan. 22, 2015

(30) Foreign Application Priority Data

Feb. 8, 2012  (JP) ................................. 2012-024677

(51) Int. Cl.
*G06F 3/041* (2006.01)
*G06F 1/16* (2006.01)
*H04M 1/02* (2006.01)

(52) U.S. Cl.
CPC .............. *G06F 3/041* (2013.01); *G06F 1/1626* (2013.01); *G06F 1/1643* (2013.01); *H04M 1/0266* (2013.01); *H04M 1/0281* (2013.01)

(58) Field of Classification Search
CPC ..... G06F 1/1626; G06F 1/1643; G06F 3/041; H04M 1/0266; H04M 1/0281
USPC ......................................................... 345/173
See application file for complete search history.

(56) References Cited

U.S. PATENT DOCUMENTS

2009/0015747 A1   1/2009  Nishizawa et al.
2010/0060604 A1*  3/2010  Zwart ................... G06F 1/1601
                                                    345/173

(Continued)

FOREIGN PATENT DOCUMENTS

JP      09-322279 A    12/1997
JP      2000-039964 A  2/2000

(Continued)

OTHER PUBLICATIONS

Official Communication issued in International Patent Application No. PCT/JP2013/052719, mailed on Apr. 23, 2013.

*Primary Examiner* — Viet Pham
(74) *Attorney, Agent, or Firm* — Keating & Bennett, LLP

(57) ABSTRACT

The electronic device is an electronic device (100) having a multilayer structure including a touch panel (12) and a display device (10), the electronic device including a manipulation surface (22A) configured to accept an input from a user, the manipulation surface being provided on a surface closer to the touch panel, and constituting a curved surface such that a central portion of the manipulation surface (22A) is dented relative to an end of the manipulation surface (22A). The most-dented portion of the manipulation surface (22A) is dented relative to an end of the manipulation surface (22A) by a distance of not less than 0.2 mm and not more than 3.0 mm along a direction perpendicular to the panel plane.

13 Claims, 9 Drawing Sheets

(56) References Cited

U.S. PATENT DOCUMENTS

| | | |
|---|---|---|
| 2010/0142127 A1 | 6/2010 | Johansson |
| 2010/0207895 A1* | 8/2010 | Joung ............ G06F 3/016 345/173 |
| 2011/0095975 A1 | 4/2011 | Hwang et al. |
| 2011/0109535 A1 | 5/2011 | Watanabe et al. |
| 2011/0242686 A1 | 10/2011 | Watanabe |
| 2012/0242588 A1* | 9/2012 | Myers ............ G06F 3/041 345/173 |

FOREIGN PATENT DOCUMENTS

| | | |
|---|---|---|
| JP | 2010-257012 A | 11/2010 |
| JP | 2011-28603 A | 2/2011 |
| WO | 2009/157150 A1 | 12/2009 |
| WO | 2010/070871 A1 | 6/2010 |

* cited by examiner (a)

(b)

(c)

(a)

(b)

(a)

(b)

ELECTRONIC DEVICE

TECHNICAL FIELD

The present invention relates to an electronic device, and more particularly to an electronic device having a touch panel display device.

BACKGROUND ART

In recent years, smartphones, digital audio players, portable game machines, tablet-type terminals, and the like that incorporate a touch panel display device are in wide use. Using a touch panel allows more intuitive inputs to be made via a screen. Using a touch panel also provides an advantage of being able to reduce the number of physical buttons to be provided on the electronic device. Therefore, it is considered that touch panels will remain as promising input devices, particularly for various small-sized electronic devices that are portable.

The number of users of smartphones having a touch panel is only increasing every year. Under such circumstances, there are growing opportunities to manipulate a touch panel while holding a smartphone in one hand. When manipulating a smartphone with one hand, it is often the case that the touch panel is manipulated with the thumb, while the body is supported with the palm, the middle finger, the ring finger, and the like.

In the present specification, the term "touch panel" may also refer to no more than a position input device (also called a touch sensor, a touch pad, etc.) which is provided on a display device, without including the display device.

CITATION LIST

Patent Literature

[Patent Document 1] Japanese Laid-Open Patent Publication No. 9-322279

SUMMARY OF INVENTION

Technical Problem

Although it is convenient to be able to manipulate a smartphone with one hand, the hand will become fatigued through continuous one-hand manipulation. The reason is that manipulating the touch panel with a thumb requires changing distance between the CM joint (carpometacarpal joint: a joint near the root of the thumb and close to the wrist), which serves as a fulcrum, and a point of manipulation on the touch panel, so that fatigue can result from bending the other joints and changing the manner of holding.

Moreover, the manipulation surface of the touch panel of a smartphone is becoming larger in area as with the display plane, such that some region exists on the manipulation surface that is difficult to reach with a thumb. As a result, people with small hand sizes are particularly experiencing difficulty with manipulation using one hand, and the burden on the hand during the manipulation is also large. Thus, there is a need for touch panel structures that are unlikely to cause manipulation fatigue.

Moreover, when a far place on the screen is to be touched with the thumb, the thumb's root or the like may accidentally touch proximal portions, thus causing malfunctioning. If one were to pay attention during manipulation in an effort to prevent this malfunctioning, fatigue will emerge in the hand.

It may also be the case that some other finger supporting the electronic device may accidentally touch the touch panel. Recent smartphones have narrower frames, such that a sensitive region of the touch panel exists also near the side faces of the device. This allows not a few inadvertent inputs to be made at the touch panel periphery, and appropriate prevention of this has been desired.

The present invention has been made in order to solve the above problems, and an objective thereof is to provide a touch panel-equipped device that can suppress occurrence of erroneous manipulations while reducing hand fatigue during manipulation.

Solution to Problem

An electronic device according to an embodiment of the present invention is an electronic device having a multilayer structure including a touch panel and a display device, the electronic device comprising a manipulation surface configured to accept an input from a user, the manipulation surface being provided on a surface of the electronic device closer to the touch panel, the manipulation surface constituting a curved surface such that a central portion of the manipulation surface is dented relative to an end of the manipulation surface, wherein a most-dented portion of the manipulation surface is dented by a distance of not less than 0.2 mm and not more than 3.0 mm relative to an end of the manipulation surface along a direction perpendicular to the panel plane.

In one embodiment, the electronic device has an outer shape of a rectangular plate; and the electronic device has a width of not less than 40 mm and not more than 70 mm and is configured to be manipulable by the user with one hand.

In one embodiment, the curved surface contains a curve with a radius of curvature of not less than 50 mm and not more than 500 mm.

In one embodiment, the display device is plate-shaped.

In one embodiment, the touch panel is disposed on a viewer's side of the display device; and the manipulation surface is provided on a light-transmitting front plate, the light-transmitting front plate being disposed so as to constitute the surface closer to the touch panel.

In one embodiment, the display device is plate-shaped; and the light-transmitting front plate is made of an acrylic resin, and includes a portion with a thickness greater than 1.7 mm on a display region of the display device.

In one embodiment, the display device is plate-shaped; and the light-transmitting front plate is made of glass, and includes a portion with a thickness greater than 2.7 mm on a display region of the display device.

In one embodiment, the light-transmitting front plate includes a convex lens portion disposed so as to cover a peripheral display region and a frame region of the display device.

In one embodiment, the light-transmitting front plate further includes a flat portion provided outside the convex lens portion.

One embodiment satisfies $3.0 \leq Y/X \leq 4.2$, where X is a width of a non-display region including the frame region; and Y is a distance from a light-outgoing surface of a display element of the display device to a lens vertex of the convex lens portion along a panel normal direction.

In one embodiment, a touch sensitivity at the end of the manipulation surface is lower than a touch sensitivity at the central portion of the manipulation surface.

In one embodiment, a distance from a display region of the display device to an outer end face of the electronic device is not less than 3 mm and not more than 5 mm.

An electronic device according to an embodiment of the present invention is an electronic device having a multilayer structure including a touch panel and a display device, the electronic device comprising a manipulation surface configured to accept an input from a user, the manipulation surface being provided on a surface closer to the touch panel, the manipulation surface constituting a first curved surface such that a central portion of the manipulation surface is dented relative to an end of the manipulation surface, wherein a convex second curved surface is formed outside of the manipulation surface, the convex second curved surface being connected continuously to the first curved surface and bulging with a curvature different from that of the first curved surface.

In one embodiment, both of the first curved surface and the second curved surface are formed on a light-transmitting front plate, the light-transmitting front plate being disposed so as to constitute the surface closer to the touch panel.

In one embodiment, the second curved surface contains a convex lens surface provided so as to cover a peripheral display region and a frame region of the display device.

In one embodiment, the display device is plate-shaped; and a sensitivity at the end of the manipulation surface is lower than a sensitivity at the central portion of the manipulation surface.

In one embodiment, the first curved surface contains a curve with a radius of curvature of not less than 50 mm and not more than 500 mm.

Advantageous Effects of Invention

With an electronic device according to an embodiment of the present invention, manipulation fatigue is unlikely to occur even when the manipulation surface of a touch panel is manipulated with one hand, and inadvertent inputs resulting from unintended touches can be suppressed.

DESCRIPTION OF EMBODIMENTS

Figure 1:
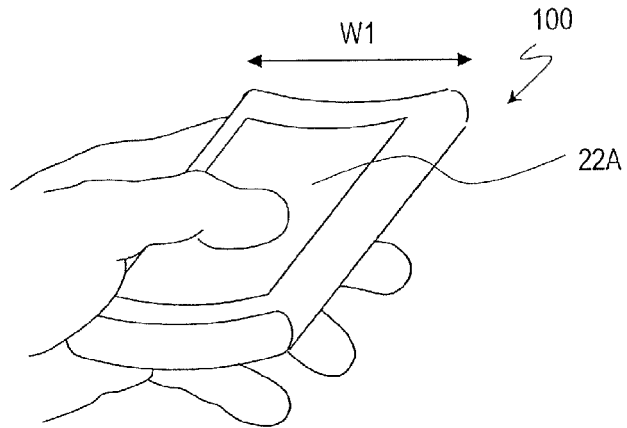
FIG. 1 A perspective view showing a state of use of an electronic device according to Embodiment 1 of the present invention.

It has been found through a study of the inventors that, in an electronic device having a touch panel, adopting a concave curved surface as the manipulation surface of the touch panel, with the central portion being dented relative to an end(s), provides an improvement in manipulability especially with respect to one hand, and allows the burden on the hand to be reduced. The shape of this concave curved surface may be appropriately chosen while considering the user's hand size and the like; however, according to an embodiment of the present invention, a difference Δd between the height at an end of the concave curved surface (manipulation surface edge) and the height at the most-dented portion (which typically is the central portion) of the concave curved surface is set so as to present a dent by a distance of not less than 0.2 mm and not more than 3.0 mm. Moreover, the concave curved surface is typically chosen to be a curved surface containing a curve having a radius of curvature of 50 mm to 1000 mm, and more preferably a curved surface containing a curve having a radius of curvature of 50 mm to 500 mm. Still more preferably, it is chosen to be a curved surface having a radius of curvature of 95 mm to 125 mm, which is equivalent to the distance from the CM joint to the thumb tip end of an average adult. Note that the above concave curved surface may be a part of a spherical surface which is defined by the aforementioned radius of curvature, or a part of a curved surface such that a curve being formed in a cross section taken along a predetermined direction presents a curve which is defined by the aforementioned radius of curvature, e.g., the side face of a cylinder. Moreover, the manipulation surface of the touch panel may be a concave curved surface which consists of an aspherical surface or a free surface; also in this case, a shape which resembles a curved surface having a radius of curvature in the aforementioned range is preferable.

When the manipulation surface of the touch panel is the aforementioned concave curved surface, it is unlikely for the thumb root or the like to touch the screen while the thumb is trying to touch a far place on the screen. Therefore, suppression of malfunctioning due to unintended touches is also expectable.

Moreover, a study of the inventors has found that a convex curved surface structure is preferably provided on the outside of the manipulation surface presenting a concave curved surface, so as to be continuous with the manipulation surface. In particular, this convex curved surface may be made of a transparent member to be utilized as a lens, whereby it becomes possible to display a magnified image in the neighborhood of the outer edge of the display region (which hereinafter may be referred to as a peripheral display region), thus providing an effect of making it unlikely for the frame region becomes to be observed and enlarging the apparent display area.

A structure in which a curved surface is adopted as the manipulation surface of a touch panel is described in Patent Document 1. However, Patent Document 1 merely describes designing the surface of a touch panel, which is provided on a remote control, so as to be a convex face or a concave face, stating that an improved manipulation feel is obtained in either case. Patent Document 1 fails to disclose any specific shape for a concave face. Moreover, in Patent Document 1, in the case where the touch panel manipulation surface is a concave curved surface, a flat face of the housing continues from immediately outside the manipulation surface. Such a construction is not suitable for any electronic device (e.g., a smartphone) whose front face is expected to be manipulated with a thumb while holding the side face or the back face.

Hereinafter, embodiments of the present invention will be described with reference to the drawings. However, the present invention is not limited thereto.

Embodiment 1

FIG. 1 and FIG. 2(a) show an electronic device 100 (e.g., a smartphone or a digital audio player) according to Embodiment 1 of the present invention. In the electronic device 100, a concave curved surface is formed as a manipulation surface 22A in a predetermined surface region of a front plate 22 which is disposed on a touch panel 12. Hereinafter, the more specific construction of the electronic device 100 will be described.

As shown in FIG. 1, the electronic device 100 is constructed so that a user holding it with one hand is able to manipulate the manipulation surface (touch surface) 22A on the front plate 22 (see FIG. 2(a)). Since manipulation with one hand is expected, the width W1 of the electronic device 100 is typically set to not less than 40 mm and not more than 70 mm.

FIG. 2(a) shows a cross-sectional structure of the electronic device 100. The electronic device 100 includes a display device 10 and a touch panel 12, which are provided as a multilayer structure 14, and the light-transmitting front plate (transparent cover) 22 which is disposed on the users'side so as to cover these. Moreover, the display device 10 and the touch panel 12 are accommodated inside a housing 20 which also functions as a cover protecting the rear face.

FIG. 2(b) shows a cross-sectional structure of the touch panel 12. As shown in FIG. 2(b), the touch panel 12 includes, on a base material 121 which is made of glass or the like, row-direction transparent electrodes 123 and column-direction transparent electrodes 125 provided thereon via an insulating layer 124, for example. Moreover, a light-transmitting cover 122 is provided so as to cover the column-direction transparent electrodes 125. The touch panel 12 is able to determine a finger position by reading changes in the electrostatic capacity that pertains to a capacitor which is created between a transparent electrode 123 or 125 and the finger via the insulators disposed thereon (the cover 122 and the front plate 22). Such a touch panel is generally referred to as a capacitance-type touch panel.

Although the touch panel 12 is described as a separate component element from the display device 10, generally speaking, the touch panel 12 and the display device 10 may collectively be referred to as a touch panel. Moreover, the front plate 22 provided on the user's side may also be regarded as part of the component elements of the touch panel 12. Note that the cover 122 and the front plate 22 of the touch panel 12 may be composed as an integral piece.

The display device 10 of the present embodiment is plate-shaped. Various display devices can be used as the display device 10, e.g., a liquid crystal display device, an organic EL display device, or an electrophoresis-type display device. The present embodiment employs a liquid crystal display device.

The display device 10 includes a display region (which may also be referred to as an active area) 10A and a frame region 10F which is provided outside the display region 10A. Pixel electrodes, TFTs, and the like are provided in the display region 10A, where images, videos, and the like are to be displayed. Provided in the frame region 10F are: a sealing portion for attaching together the substrates in such a manner that a liquid crystal material is sealed in between the substrates; wiring that is connected to gate electrodes and source electrodes of the TFTs; external terminals for providing connection to external driving circuits which input scanning/signal voltages; and the like. Displaying is not performed in the frame region 10F.

Recently, the frame region 10F is becoming narrower and narrower in width with improvements in sheet printing techniques and techniques for making wiring into thinner lines, and there are some which are capable of performing displaying in a region which is close to substantially the entire face of the electronic device 100. The distance from an end 100S to a display region 10A of the electronic device 100 (i.e., the width of a non-display region including the frame region 10F and a housing flank) is set to e.g. 3 mm to 5 mm along the shortest sides.

The touch panel 12, which is typically placed on the display plane side (the user's side) of the display device 10, is a device that senses a position which is touched with a finger or the like to enable input. In the present embodiment, as described above, a capacitance-type touch panel 12 is used. As the base material 121 and the cover 122 of the touch panel 12, light-transmitting materials can be used, e.g., glass or resin films.

The front plate 22 is made of a material which has good light transmittance, e.g., an acrylic resin or glass, and its face oriented toward the user constitutes a concave curved surface. The face (back face) of the front plate 22 oriented toward the touch panel 12 is generally a plane, but may have stepped portions or the like provided thereon as necessary, thus to conform to the shape and the like of the touch panel 12. In the region of the front plate 22 outside the display device 10, a pattern, etc., may be formed by printing or the like.

The housing 20, which serves to protect the display device 10 and the like, is made of a general-purpose resin, a magnesium alloy, or the like. Although not shown, a space in which a circuit board, a battery, and the like are to be fitted exists in the rear face of the display device 10, and thus these are also accommodated inside the housing 20. When the housing at the rear face side (i.e., the opposite side from the side where the touch panel 12 is provided) is shaped into a convex curved surface, there is an advantage in that holding is facilitated because it fits the hand shape. However, various shapes may be adopted as the rear face shape for the housing 20, as will be described later.

The touch panel 12 provided on the display device 10 could render all region of the display region 10A of the display device 10 manipulable. However, when a narrow-framed display device 10 is used, malfunctioning might be caused by a mere touch on a portion near an end (side face) of the electronic device 100.

Figure 3:
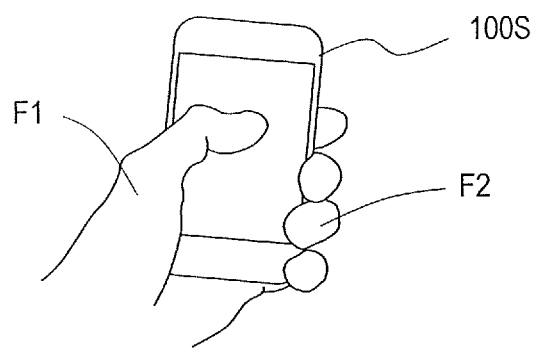
FIG. 3 A diagram for describing how an erroneous manipulation (malfunction) may occur when using a conventional electronic device.

More specifically, as shown in FIG. 3, malfunctioning may be caused by a touch made by the root F1 of the thumb holding the electronic device 100, the middle finger/ring finger F2, or the like. Therefore, it is more convenient in actual use if touch panel manipulations are not permitted in the region near the ends 100S of the electronic device 100.

Through prototyping and studies, the inventors have found that establishing a region which does not permit touch panel manipulation, such that the region spans at least about 5 mm or more from each end 100S of the electronic device 100, reduces malfunctioning in various ways of holding. Stated conversely, malfunctioning is likely to occur when a manipulable region of the touch panel exists within 5 mm from any end 100S of the electronic device 100.

When the display device 10 and the touch panel 12 (capacitance-type) are plate-shaped, such that the surface of the front plate 22 is a concave face, as in the present embodiment, sensitivity (touch sensitivity) of touch panel manipulation can be controlled by adjusting the thickness of the front plate 22. By setting the thickness of the front plate 22 to a predetermined thickness or more, a region which virtually does not permit touch manipulation can be provided. Although making the touch panel 12 itself small would also provide a region which does not permit touch manipulation in the periphery of the display region, this may not be very preferable because doing so would allow wiring electrodes, mounted elements, and the like which are provided around the touch panel 12 to overlap the display region, thus hindering displaying.

The sensitivity of the capacitance-type touch panel 12 will vary depending on the material (dielectric constant) and thickness of the front plate 22. Good touch sensitivity will be obtained while the thickness of the front plate 22 is up to a certain level; however, the touch sensitivity will become poor if it is too thick.

When the front plate 22 is made of an acrylic resin, the limit thickness up to which it can function as a touch sensor is about 2 mm; when it is made of glass, this limit thickness is about 3 mm (the limit value of thickness is determined by the difference in dielectric constant between the acrylic resin and glass). Therefore, by setting the thickness of the front plate 22 to a thickness exceeding the aforementioned limit value at the peripheral edge of the display device 10 or the touch panel 12, without particularly modifying the touch panel 12 from the conventional construction, the touch panel sensitivity can be lowered near the end face, whereby a region which does not permit touch panel manipulation can be provided even on the display region 10A. Although the present specification mentions acrylic resins and glass as the materials of the front plate 22, it will be appreciated that other materials can also be used. For example, a transparent resin material such as polycarbonate or polycarbonate, a gel material such as silicone gel, and the like can be used; since these all have dielectric constants close to that of an acrylic resin, the limit value of manipulable thickness when forming the front plate 22 is similar to that for an acrylic resin.

Figure 2:
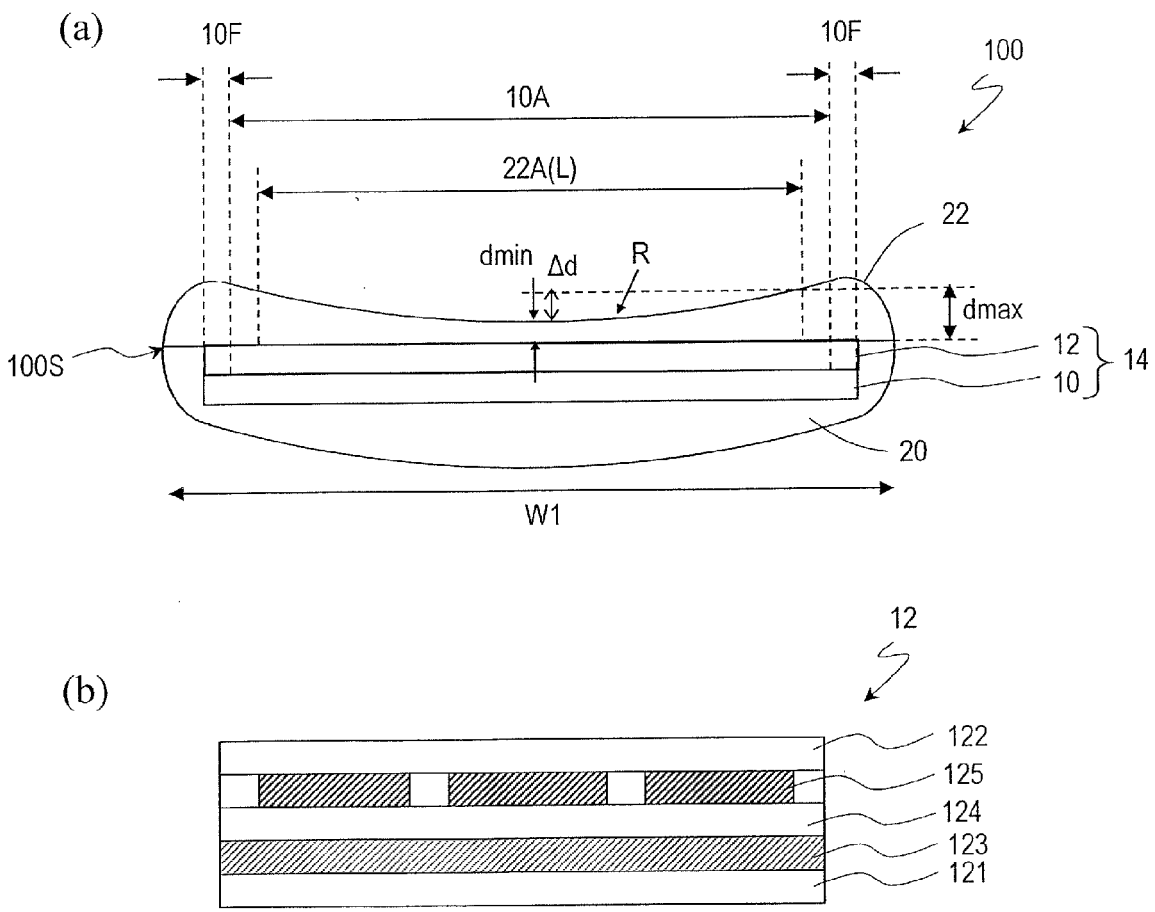
FIG. 2 (*a*) is a schematic diagram showing a cross section of the electronic device of Embodiment 1; and (*b*) is a cross-sectional view showing the construction of a touch panel.
Figure 2:
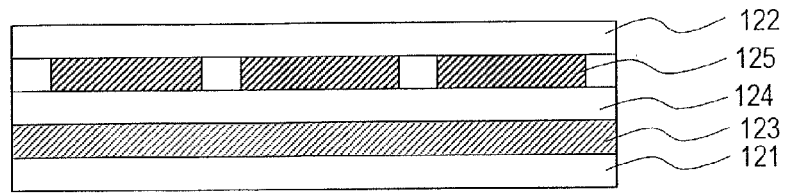

Hereinafter, a construction for lowering the sensitivity of the touch panel near the ends will be specifically described, with reference to FIG. 2(*a*).

Assuming that the manipulation region (manipulation surface) 22A on the front plate 22 which permits touch panel manipulation has a width L; the front plate 22 has a thickness dmax at an end of the manipulation region 22A (i.e., the boundary with the non-manipulable region); the most-dented portion of the manipulation region 22A (which typically is the central portion of the manipulation region 22A) has a thickness dmin; and the concave curved surface has a radius of curvature R, then the following relational expression holds true. In the following eq. (1), Δd=dmax−dmin holds, where Δd represents how dented the manipulation region 22A is (i.e., the difference (distance) in height between the end of the manipulation region 22A and the most-dented portion (central portion) along the panel normal direction).

[eq. 1]

$$\Delta d = R - \sqrt{R^2 - \frac{L^2}{4}} \tag{1}$$

The thickness dmax is the largest thickness up to which touch panel manipulation is not hindered, which is about 2 mm in the case of using an acrylic resin, and about 3 mm in the case of using glass, as mentioned above. The thickness dmin of the thinnest portion is defined as the smallest thickness that can be realized by a commonly-used molding technique which can mass produce the front plate 22 at low cost, this thickness being about 0.3 mm.

Therefore, a generally design-permissible range of Δd is as follows.

For acrylic resin: Δd=0 to 1.7 mm
For glass: Δd=0 to 2.7 mm

It will be appreciated that, depending on the dielectric constant and the like of the material that is actually used, the aforementioned design-permissible range of Δd may vary. Moreover, the value somewhat varies also depending on the sensitivity of the touch panel in an actual state of use, the amount of electrical noise occurring from the display device, and so on.

Table 1 below shows a relationship between Δd and radius of curvature R when the width L of the manipulable region 22A is set to each different value. Herein, the radius of curvature R is the radius of curvature of a curve that appears when the concave curved surface is cut vertically along the direction defining the width L (which in the present embodiment is the right-left direction of the electronic device 100).

As mentioned above, the possible range of Δd may vary depending on the material, but it has been found that a concave curved surface whose Δd is not less than 0.2 mm and not more than 3.0 mm is appropriate for reducing the hand fatigue during manipulation, this being particularly preferably set to not less than 0.4 mm and not more than 3.0 mm. Although the lower limit of Δd is preferably increased as the width L of the electronic device increases, the lower limit of Δd is set to 0.2 mm: this is meant as a range in which an effect of reducing hand fatigue can be attained over the case where the manipulation surface is a flat face, in an electronic device which is sized so that one-hand manipulation is generally expectable (width 40 mm to 70 mm). As will be described later, if Δd is set to less than 0.2 mm (i.e., the radius of curvature exceeding 1000 mm), no difference will be felt in actual use relative to manipulating a flat face, and presumably this will not provide any effect of reducing hand fatigue.

Moreover, a suitable range for the radius of curvature R defining the curved surface is also set so as to correspond to the range for Δd which has thus been set. Note that, when Δd=0, a flat face exists so that the value of the radius of curvature R is infinite.

TABLE 1

| Δd [mm] | R [mm] L = 40 | L = 50 | L = 60 | L = 70 |
|---|---|---|---|---|
| 0.1 | 2000 | 3125 | 4500 | 6125 |
| 0.2 | 1000 | 1563 | 2250 | 3063 |
| 0.3 | 667 | 1042 | 1500 | 2042 |
| 0.4 | 500 | 781 | 1125 | 1531 |
| 0.5 | 400 | 625 | 900 | 1225 |
| 0.6 | 334 | 521 | 750 | 1021 |
| 0.7 | 286 | 447 | 643 | 875 |
| 0.8 | 250 | 391 | 563 | 766 |
| 0.9 | 223 | 348 | 500 | 681 |
| 1.0 | 201 | 313 | 451 | 613 |
| 1.1 | 182 | 285 | 410 | 557 |
| 1.2 | 167 | 261 | 376 | 511 |
| 1.3 | 154 | 241 | 347 | 472 |
| 1.4 | 144 | 224 | 322 | 438 |
| 1.5 | 134 | 209 | 301 | 409 |
| 1.6 | 126 | 196 | 282 | 384 |
| 1.7 | 118 | 185 | 266 | 361 |
| 1.8 | 112 | 175 | 251 | 341 |
| 1.9 | 106 | 165 | 238 | 323 |
| 2.0 | 101 | 157 | 226 | 307 |
| 2.1 | 96 | 150 | 215 | 293 |
| 2.2 | 92 | 143 | 206 | 280 |
| 2.3 | 88 | 137 | 197 | 267 |
| 2.4 | 85 | 131 | 189 | 256 |
| 2.5 | 81 | 126 | 181 | 246 |
| 2.6 | 78 | 121 | 174 | 237 |
| 2.7 | 75 | 117 | 168 | 228 |
| 2.8 | 73 | 113 | 162 | 220 |
| 2.9 | 70 | 109 | 157 | 213 |
| 3.0 | 68 | 106 | 152 | 206 |

SHAPES THAT ARE EASY TO DESIGN WITH GENERAL PURPOSE GLASS Δd = 0~2.7 mm

SHAPES THAT ARE EASY TO DESIGN WITH ACRYLIC RESIN Δd = 0~1.7 mm
a1
a2

For example, in the case of using an acrylic resin as the material, where the manipulable region 22A has a width L=50 mm, it is preferable to set the radius of curvature R to 185 mm or more, because of the generally design-permissible Δd value (0 to 1.7 mm). In the case where the radius of curvature R is 1000 mm or more, it is almost no different from a flat face; therefore, the upper limit of the radius of curvature R is herein set to 1000 mm. Thus, it is preferable to set the range for the radius of curvature R to 185 to 1000 mm.

Touch sensitivity increases as the front plate 22 becomes thinner. Therefore, it is preferable to set dmin as small as possible. In other words, dmin is preferably about 0.3 mm, which is the common machining limit. Of course, if technological advancements in molding techniques enable thinner molding or if some other method allows it to be made thinner, it is believed that dmin could be reduced to about 0.1 mm.

When a region which does not permit touch manipulation is provided outside the manipulation region 22A on the display region 10A of the display device 10 in the aforementioned manner, if an acrylic resin is used as the front plate 22, a portion with a thickness greater than 1.7 mm (typically a thickness greater than 1.7+0.3=2.0 mm) will exist on the display region 10A. If glass is used as the front plate 22, a portion with a thickness greater than 2.7 mm (typically a thickness greater than 2.7+0.3=3.0 mm) will exist on the display region 10A. Such constructions allow a region which does not permit touch manipulation to be formed on the display region 10A without substantially modifying the touch panel 12.

Although the above describes preferable design conditions in the case of using an acrylic resin or glass, which are generally used for front plates, it is also conceivable that other materials may be used for the front plate (materials with higher dielectric constants), and the electronic device of the present invention is not limited to the above design conditions.

<Thumb Motion>

Hereinafter, more suitable shapes for the concave curved surface constituting the manipulation surface 22A will be described.

Figure 4:
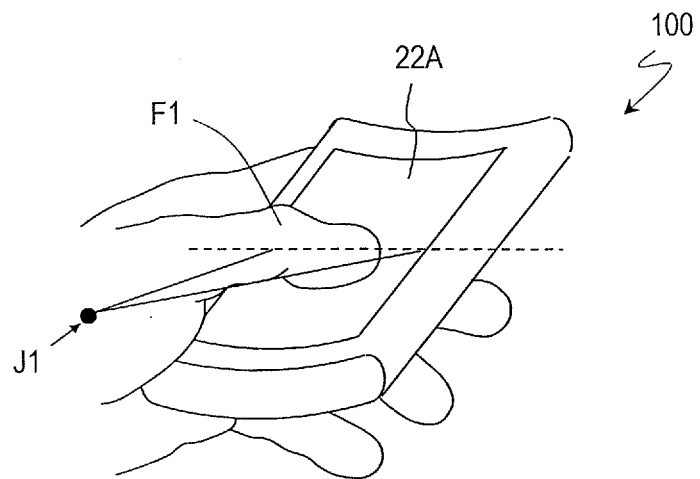
FIG. 4 A diagram for describing a manner of one-hand use of the electronic device of Embodiment 1.

It is well known that, when a thumb is used, a motion occurs with the CM joint as a fulcrum. When making a touch panel manipulation, too, a manipulation with the thumb occurs with the CM joint as a fulcrum. As shown in FIG. 4, the CM joint J1 is a joint which is near the root of the thumb.

Through a study of the inventors, it has been found that, when making a touch panel manipulation, the burden on the finger is smaller when the fulcrum (position of the CM joint) of the thumb is in close proximity to the center (center of curvature O) of a circle of curvature that defines the concave curved surface formed on the front plate 22.

Figure 5:
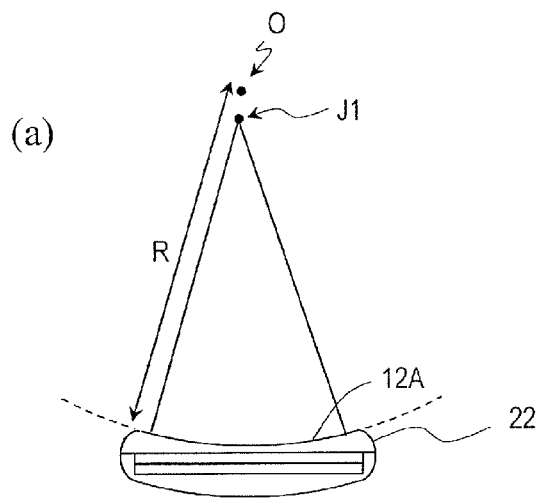
FIG. 5 A diagram showing relationships between the position of the CM joint of a thumb and the position of the center of curvature of a touch panel manipulation surface, where (a) to (c) respectively show manipulation surfaces with different shapes.
Figure 5:
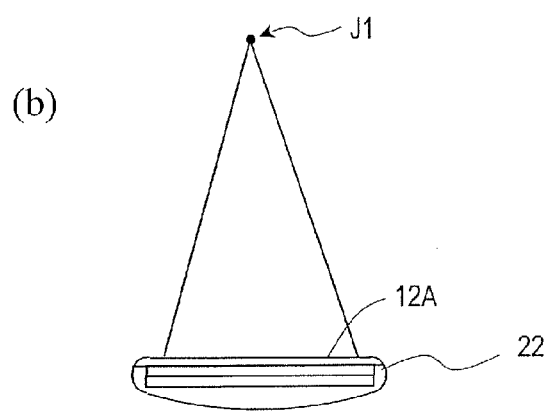
Figure 5:
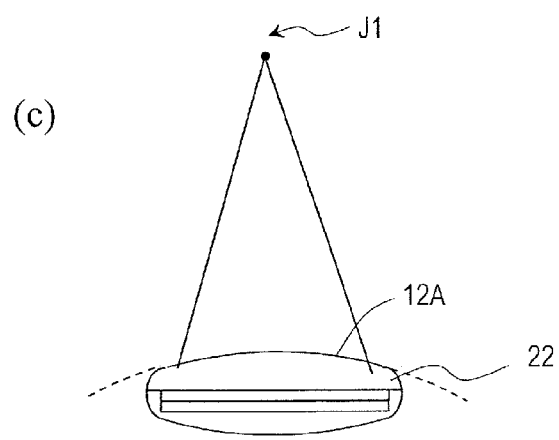
Figure 5:

FIGS. 5(a) to (c) show relative positioning of the CM joint J1 and the center of curvature O with respect to manipulation surfaces of different shapes. As shown in FIG. 5(a), when the CM joint J1 and the center of curvature O are in close proximity, during a manipulation on the touch panel, the distance between the CM joint J1 and the thumb tip end is not much different from the distance between the CM joint J1 and the point of manipulation (an arbitrary point on the manipulation surface 22A), no matter which place on the screen is touched. In this case, there is little bending or stretching of any other thumb joints (the IP joint and the MP joint), and the manner of holding the device with the entire left hand (or right hand) is hardly changed and thus a smooth manipulation can be conducted, whereby hand fatigue is reduced.

Herein, the length from the CM joint J1 to the fingertip is within a range of about 95 to about 125 mm for an adult of a common body size. Therefore, it would be preferable to set the radius of curvature R of the surface of the front plate 22 to 95 to 125 mm because this would bring the CM joint J1 and the center of curvature O closest together. However, a sufficient effect of fatigue reduction was felt also by setting the radius of curvature R in a range of 50 to 500 mm (this range being indicated in a bold frame a2 in Table 1 above). Moreover, by setting the radius of curvature R in a range of 50 to 1000 mm, fatigue is reduced at least as compared to manipulating on a flat face (this range being indicated in a bold frame a1 in Table 1 above). In a device which is mainly targeted at users in whom the distance from the CM joint J1 to the fingertip is clearly away from the range of 95 to 125 mm, e.g., children, a matching curved surface design may be adopted through modification.

In the case where the CM joint J1 is greatly deviated from the center of curvature O, the distance from the CM joint J1 to the point of contact on the touch panel will greatly vary depending on the position of touch on the screen; therefore, in order to perform an appropriate touch manipulation, the distance between the CM joint J1 and the thumb tip end must be adjusted (e.g., through bending or stretching the IP joint and the MP joint). This increases the burden on the hand during manipulation. In particular, if manipulation is performed for a long time, disorders such as tendinitis may be caused.

Clear instances in which the CM joint J1 and the center of curvature O are greatly deviated are, as shown in FIGS. 5(b) and (c): where the front plate 22 is shaped as a planar face (i.e., the center of curvature O is a point at infinity); where the front plate 22 is convex shaped (i.e., the center of curvature O is on the device rear face side); and so on. If the manipulation surface of the touch panel has any such shapes, fatigue is likely to build in the hand when one-hand manipulations are continuously made.

<Rear Face Shape>

Figure 6:
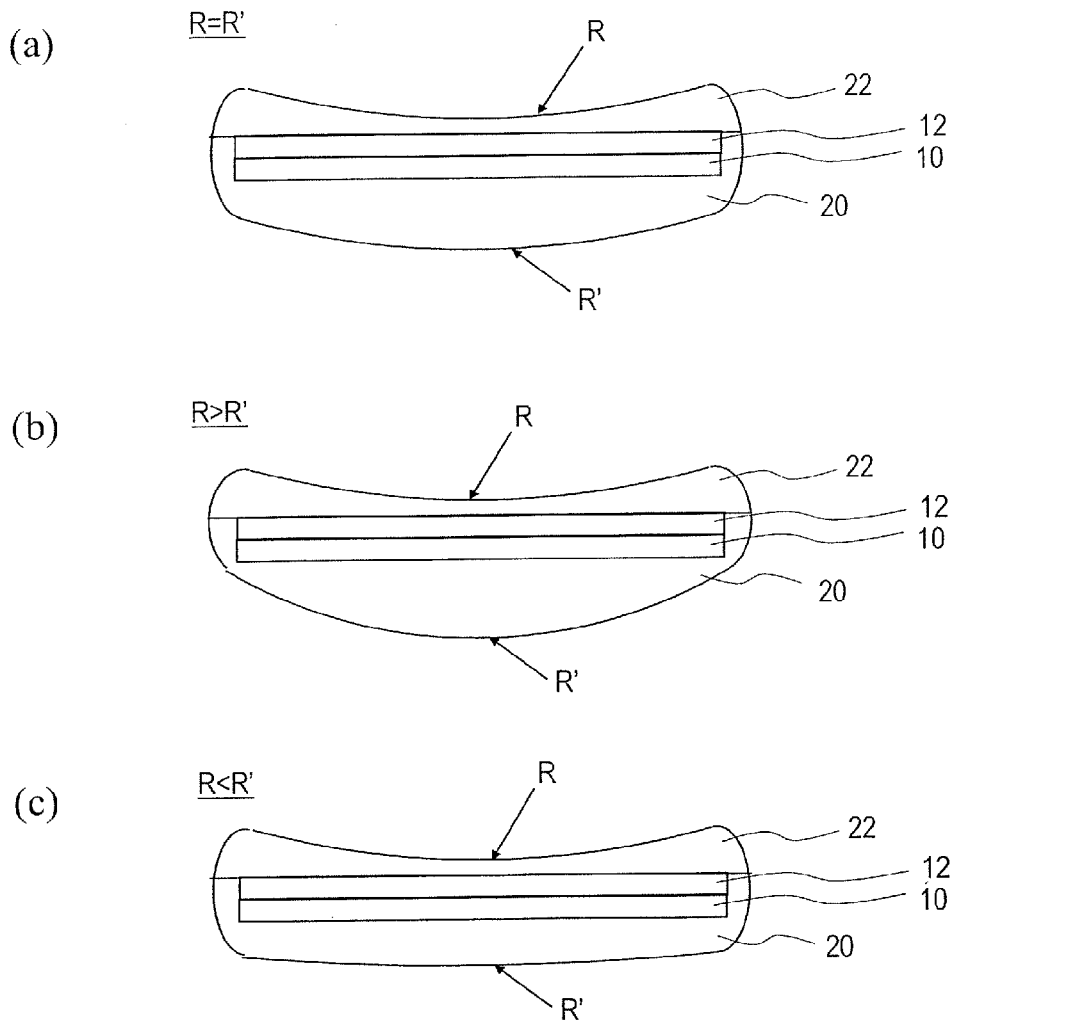
FIG. 6 Cross-sectional views for describing exemplary modifications, etc., of the electronic device of Embodiment 1, where (a) shows a case where the front face radius of curvature R is equal to the rear face radius of curvature R'; (b) shows a case where R>R' and (c) shows a case where R<R'.

As shown in FIGS. 6(a) to (c), the rear-face shape of the housing 20 may be any arbitrary shape.

Assuming that the front plate 22 constituting a concave face has a radius of curvature R and that the housing rear face constituting a convex face has a radius of curvature R', as shown in FIGS. 6(a) and (b), the end face portions are relatively thin when R=R' or R>R', thus making the entire device feel thin and stylish.

As shown in FIG. 6(c), when R<R', the end face portions are thick, thereby making the entire device feel thick; however, there is an advantage of enhanced holding feel when it is taken in the hand, thus resulting in good manipulability.

Moreover, so long as it is a concave face (i.e., the front plate 22 being thicker in the ends than in the central portion), the surface shape of the front plate 22 does not need to be the side face of a cylinder (or a spherical surface), and may be an aspherical surface, a free surface, or the like.

Thus, in the electronic device 100 of the present embodiment, the manipulation surface 22A constitutes a curved surface which is dented by an appropriate degree. Therefore, even if the touch panel is present within 5 mm from the ends of the device, malfunctioning due to an unintentional touch of a finger on the device side face can be prevented. Preferably, the touch panel manipulation surface is chosen to be a concave curved surface having a radius of curvature of 50 mm to 500 mm, whereby fatigue of the finger performing a touch panel manipulation can be reduced.

Embodiment 2

Figure 7:
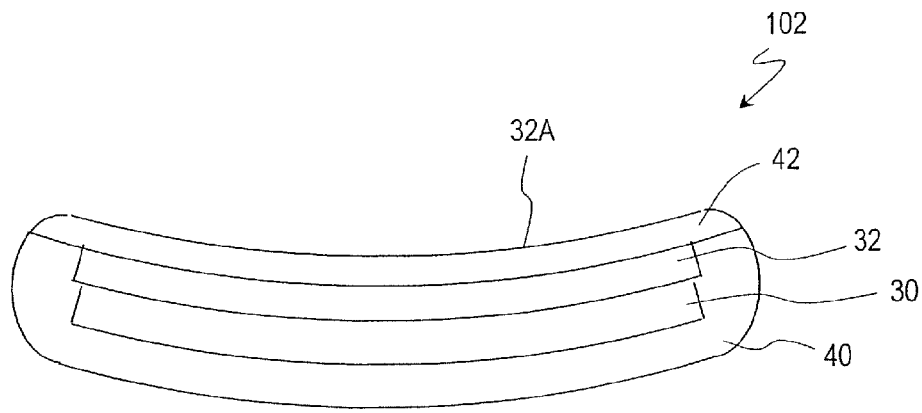
FIG. 7 A schematic diagram showing a cross section of an electronic device according to Embodiment 2 of the present invention.

FIG. 7 shows a cross section of an electronic device 102 according to Embodiment 2. The structure of the electronic device 102 is substantially similar to the structure of the electronic device 100 of Embodiment 1, except that a touch panel 32 and a display device 30 constitute curved plates. Note that a front plate 42 and a housing 40 are shaped so that the touch panel 32 and the display device 30 can be held appropriately.

In the electronic device 102 of the present embodiment, the touch panel 32 and the display device 30 constitute curved plates, and thus they are preferably formed by using a flexible base material such as a resin. For example, a PET film with a thickness of 0.2 mm or the like may be used as a base material to form the touch panel 32 and the display device 30, and they may be attached together with a front plate 42 which is formed into a curved plate, thereby producing the electronic device 102.

In the present embodiment, too, a manipulation surface 32A of the touch panel has a concave curved surface whose central portion is more dented than whose ends, so that fatigue of the finger performing a touch panel manipulation can be reduced. Moreover, since the manipulation surface of the touch panel is chosen to be a concave curved surface, the thumb root is restrained from touching the manipulation surface even when manipulations are performed with one-hand holding. As a result, malfunctioning can be reduced.

When a narrow-framed display device 30 is used, malfunctioning is particularly likely to occur at the edge of the device. Therefore, malfunctioning may be prevented through modifications such as forming the frame region so as to be relatively thick, or ensuring that electrode patterns of the touch panel are not provided in any region that is near a device end face.

Embodiment 3

Figure 8:
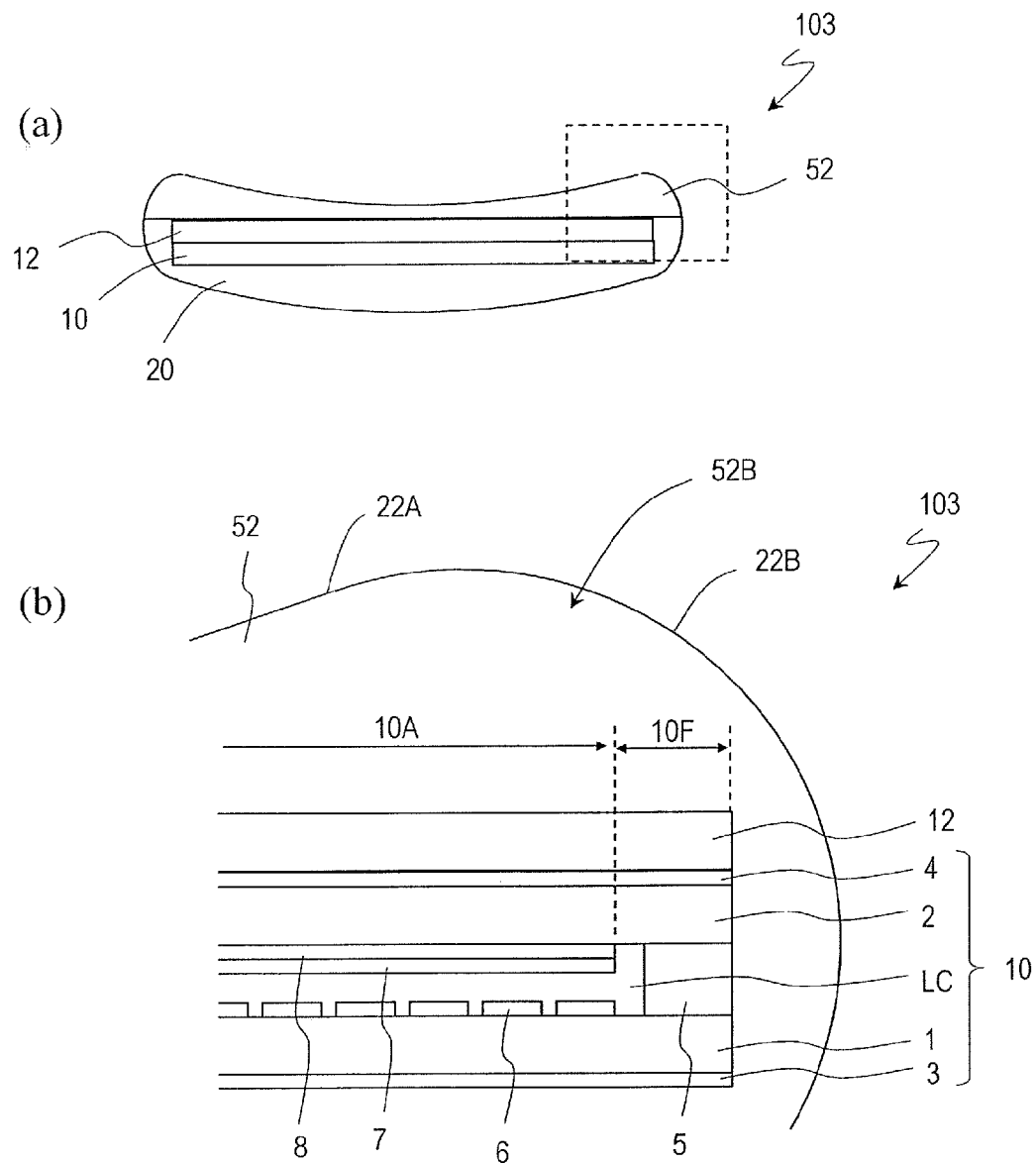
FIG. 8 A diagram showing a cross section of an electronic device according to Embodiment 3 of the present invention, where (a) is an overall view; and (b) is an enlarged view in which a region surrounded by a broken line in (a) is shown enlarged.

FIGS. 8(a) and (b) show a cross section of an electronic device 103 according to Embodiment 3, where (b) shows enlarged a portion surrounded by a broken line in (a).

The electronic device 103 of the present embodiment differs from the electronic device 100 of Embodiment 1 in that an end 52B of a front plate 52 includes a convex curved surface 22B having a curvature which is intentionally chosen, and is disposed so as to overlap both the display region 10A of the display device 10 and the frame region 10F.

In such construction, the front plate 52 includes the following on its surface: a manipulation surface 22A constituting a concave curved surface; and a convex curved surface 22B disposed outside the manipulation surface 22A. The ends 52B of the front plate 52 are able to refract light which is emitted from the periphery of the display region 10A of the display device 10 (which may also be referred to as the peripheral display region).

As a result, in the region corresponding to the frame region 10F, light emitted from the peripheral display region travels in the direction of the user (which typically is the panel plane normal direction), thus allowing the user to view an image or video also in the frame region 10F. In other words, each end 52B having the convex curved surface 22B functions as a convex lens which allows an image, video, etc., in the peripheral display region to be displayed with magnification over to the frame region.

In the present embodiment, the display device 10 is a liquid crystal display device having a TFT substrate 1, a counter substrate 2, and a liquid crystal layer LC which is sealed in and retained therebetween with a sealant 5. The TFT substrate 1 includes pixel electrodes 6 and the like which are provided for the respective pixels, whereas the counter substrate 2 includes a counter electrode 7 opposing the pixel electrodes 6, color filters 8, and so on. On the outside of the TFT substrate 1 and the counter substrate 2, optical elements 3 and 4 are provided which typically are polarization films, such that displaying can be performed by modulating light from a backlight unit (not shown) which is provided on the rear face of the TFT substrate 1.

Hereinafter, the shape of the convex curved surface (convex lens surface) 22B will be described.

Figure 9:
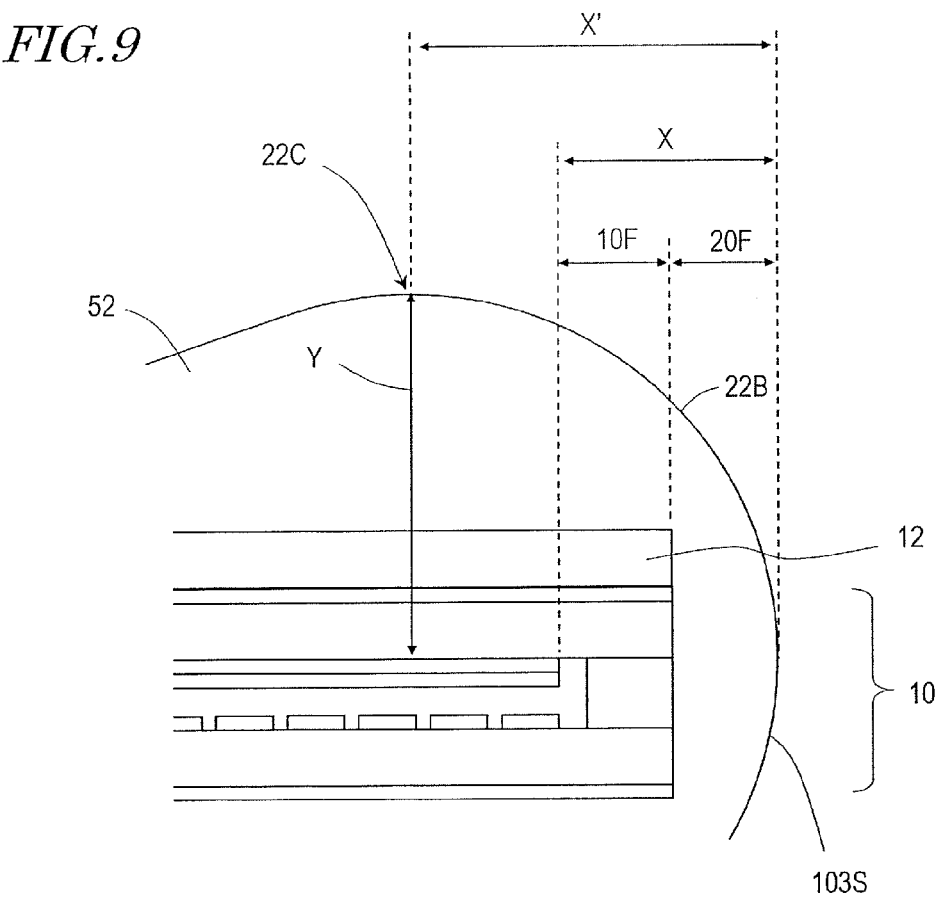
FIG. 9 A cross-sectional view showing enlarged a region surrounded by a broken line in FIG. 8(*a*).

As shown in FIG. 9, it is assumed that the width of a non-display region including the frame region 10F and the side-face housing 20F, as well as any gap, adhesion layer, etc. (not shown) that exists between them, is X, and that there is a width X' from an end face 103S to a vertex 22C of the convex face. It is also assumed that there is a thickness (i.e., distance from the light-outgoing surface of the liquid crystal layer LC (or the color filters 8) to the front surface of the front plate 52 along the panel normal direction, at a position where the end 52B has the maximum thickness (i.e., the convex lens vertex)) of Y from the display element (liquid crystal layer LC), the thickness Y including the largest thickness of the front plate 52, the thickness of the touch panel, the thickness of the optical film layer, and the thickness of any gap, adhesion layer, etc. (not shown) that exists between them. In this case, the following design is conceivable, for example.

Material of the front plate 52: glass
X=1.3 mm (frame region width 0.8 mm+housing flank width 0.5 mm)
X'=5.8 mm
Y=5.2 mm (maximum thickness of front plate 4.1 mm+touch panel thickness 0.7 mm+optical film layer thickness 0.1 mm+counter substrate thickness 0.3 mm)
R1=7.4 mm
k=0.75

Herein, R1 is a radius of curvature for defining the convex curved surface (lens surface) 22B, and k is an aspherical coefficient (conic constant) for defining the convex curved surface 22B. In the present embodiment, the convex curved surface 22B constitutes an aspherical surface which is approximated by the aspherical formula: $f(x)=Y-cx^2/(1+(1-(1+k)c^2x^2)^{1/2}$ (where $c=1/R1$, and x is the distance from the lens center). The shape of the lens surface which is provided so as to cover an end of such a display device may be a curved surface that is defined by the aspherical function described in International Publication No. 2009/157150. The entire disclosure of International Publication No. 2009/157150 is incorporated herein by reference.

When the front plate 52 is made of a material whose refractive index is close to 1.5, e.g., an acrylic resin or glass, light is efficiently refracted by setting Y to be 3.0 to 4.2 times as large as X (i.e., so that Y/X is not less than 3.0 and not more than 4.2), whereby the non-display region is obscured. Herein, Y means the distance, from the light-outgoing surface of an element which actually performs displaying, to the lens vertex along the panel plane normal direction. For example, the light-outgoing surface of an element which actually performs displaying would correspond to: in the case of a liquid crystal display device, the light-outgoing surface of the liquid crystal layer (or the light-outgoing surface of color filters when any color filters are provided); and, in the case of a self-light-emitting type display device such as an organic EL display device, the surface of the light-emitting element.

In the case of materials with higher refractive indices, the multiple (Y/X) will decrease essentially in inverse proportion to the value of refractive index. For example, if the refractive index is 1.74, then it is preferable to set Y so as to be about 2.4 to about 3.2 times as large as X (so that Y/X is not less than about 2.4 and not more than about 3.2).

Although the above illustrates an example where the convex curved surface 22B is an aspherical surface, this is not a limitation. Similar effects can be obtained with any shape that is capable of functioning as a lens, e.g., a spherical shape, an elliptical curved surface shape, or a free surface.

Figure 10:
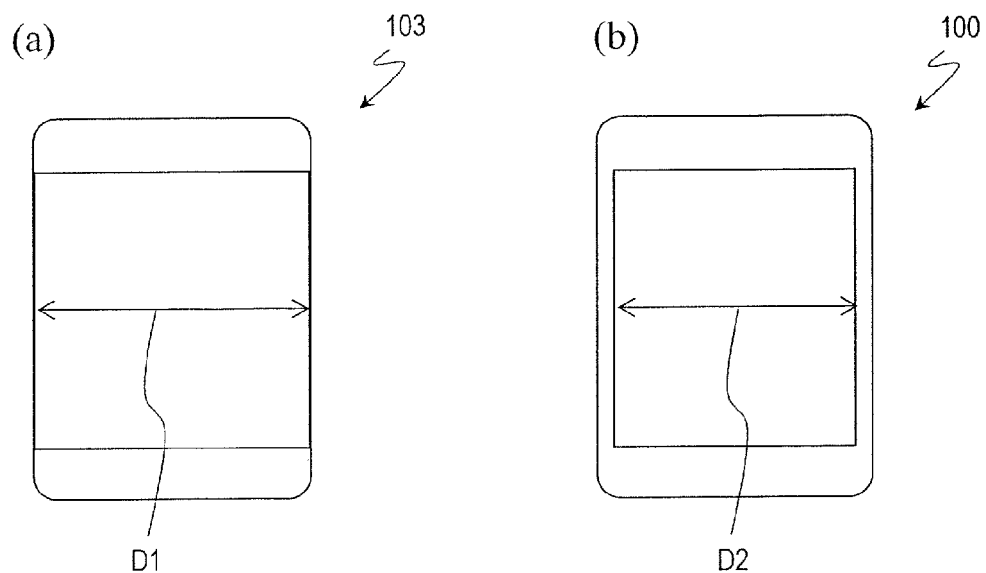
FIG. 10 (*a*) shows an apparent display region of the electronic device of Embodiment 3, and (*b*) shows an apparent display region of the electronic device of Embodiment 1.

FIGS. 10(a) and (b) respectively show a display effective region of the electronic device 103 and an effective display region of the electronic device 100 of Embodiment 1. As shown in FIG. 10(a), the display region of the electronic device 103 has a width D1 which is broader than a width D2 of the display region of the electronic device 100. That is, with the electronic device 103, the screen appears even broader than on the electronic device 100, such that displaying is possible up to the device end faces, and the display plane can be effectively utilized even when the device is small.

Embodiment 4

Figure 11:
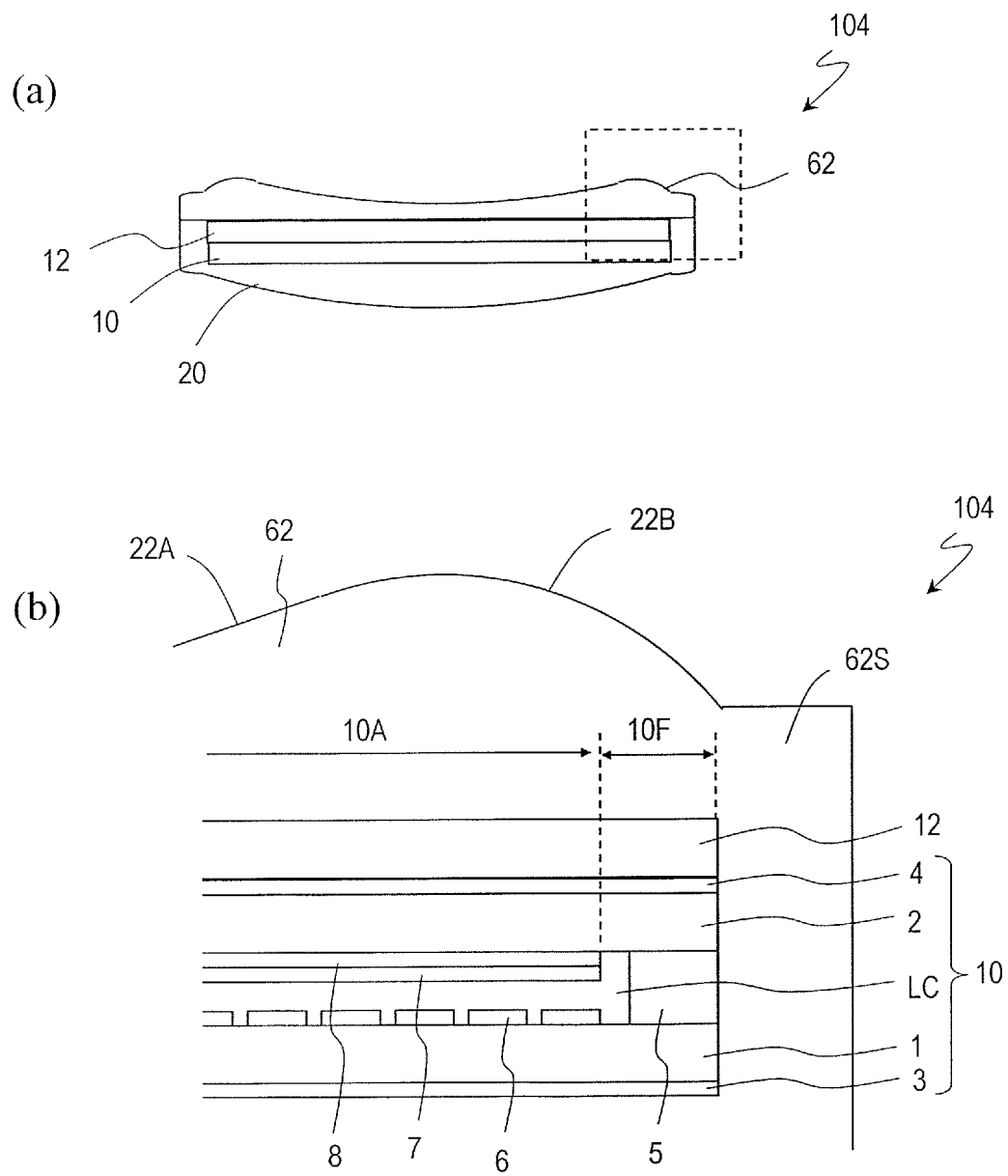
FIG. 11 A schematic diagram showing a cross section of an electronic device according to Embodiment 4 of the present invention, where (a) shows an overall view; and (b) shows an enlarged view in which a region surrounded by a broken line in (a) is shown enlarged.

FIGS. 11(a) and (b) show a cross section of an electronic device 104 according to Embodiment 4, where (b) shows enlarged a portion surrounded by a broken line in (a).

The electronic device 104 of Embodiment 4 differs from the electronic device 103 of Embodiment 3 in that, without providing the convex curved surface 22B up to the device end faces, a side-face housing 62S close to a flat plate is provided outside the convex curved surface 22B, thus resulting in a discontinuous shape. The side-face housing 62S is preferably made of a light-transmitting member so that a background which is located on the rear face side of the electronic device 104 shows through.

By doing so, light which is emitted from the display device 10 is refracted at the convex curved surface 22B, so that the display region appears as if expanded onto the frame region 10F, and even the background will show through in the case where the side-face housing 62S is light-transmitting, resulting in an appearance as if no frame or the like exists at the boundary between the display region 10A and the background. Moreover, the maximum thickness of the front plate 62 may be thinner than in Embodiment 3.

Figure 12:
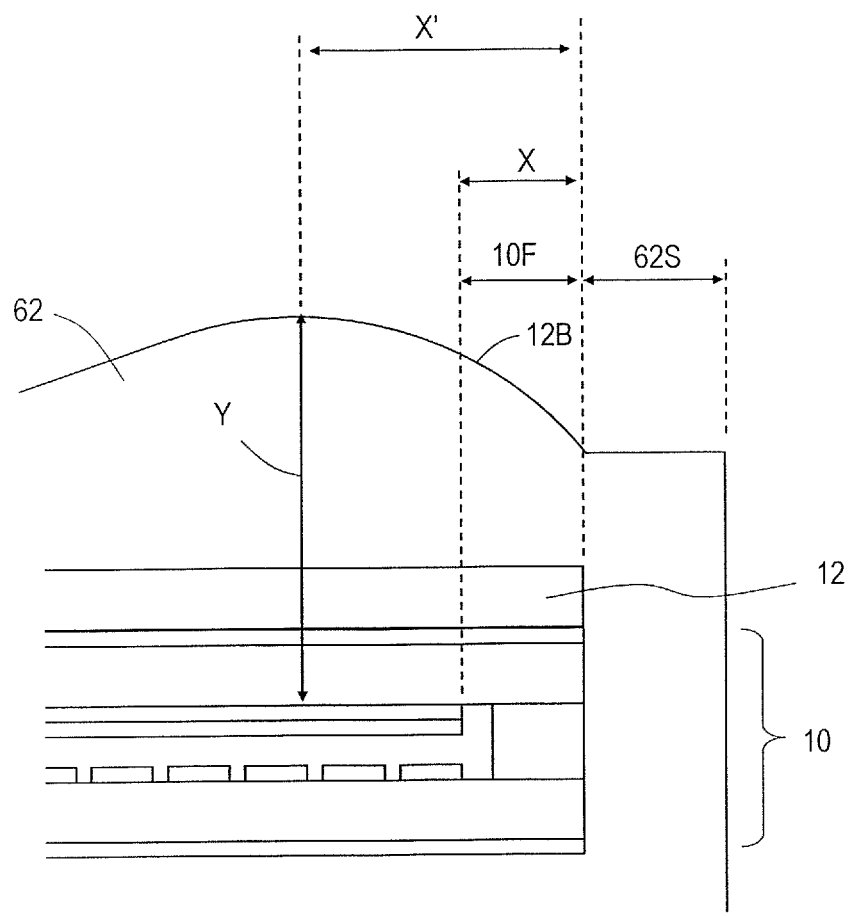
FIG. 12 A cross-sectional view showing enlarged a region surrounded by a broken line in FIG. 11(*a*).

As shown in FIG. 12, similarly to Embodiment 3, it is assumed that the width of a non-display region including the frame region 10F is X, and that the width from an end face of the convex face to the vertex of the convex face is X'. It is also assumed that there is a thickness Y from the display element, including the thickness of the largest portion of the front plate 62 and the thicknesses of the touch panel 12, the optical film layer 4, and any gap, adhesion layer, etc. (not shown) that exists between them. In this case, the following design is conceivable, for example.

Material of the front plate 62: acrylic resin
X=0.8 mm (frame region 0.8 mm)
X'=3.4 mm
Y=3.2 mm (front plate 2.1 mm+touch panel 0.7 mm+optical film layer 0.1 mm+counter substrate 0.3 mm)
R1=4.5 mm
k=0.75

Note that, similarly to Embodiment 3, when the front plate 62 is made of a material whose refractive index is close to 1.5, e.g., an acrylic resin or glass, light is efficiently refracted by ensuring that Y is 3.0 to 4.2 times as large as X, whereby the non-display region is obscured. In the case of materials with higher refractive indices, the multiple is preferably set so as to be small, essentially in inverse proportion to the value of refractive index. For example, when the refractive index is 1.74, Y is preferably about 2.4 to about 3.2 times as large as X.

Figure 13:
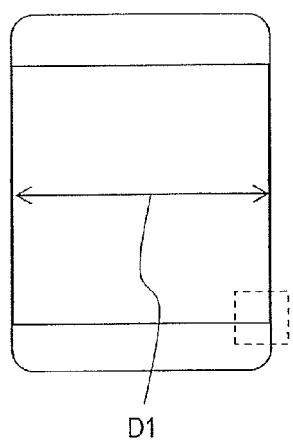
FIG. 13 (*a*) shows an apparent display region of the electronic device of Embodiment 4, and (*b*) is an enlarged view of a region surrounded by a broken line in (*a*).
Figure 13:
Figure 13:
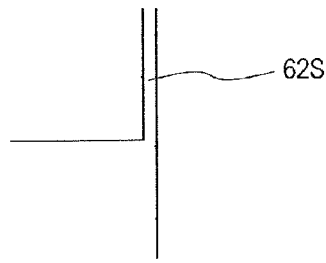

In the present embodiment, effects similar to those of the electronic device 103 of Embodiment 3 are obtained even when using a thinner front plate 62, and a further effect is obtained in that the entire electronic device 104 can be made thin and light-weight. As shown in FIGS. 13(a) and (b), the screen of the electronic device 104 appears as if expanded. Therefore, displaying is possible up to the device end faces; the display plane can be effectively utilized even when the device is small; and, by choosing the side-face housing 62S to be transparent, the background will show through as if the frame did not exist.

Embodiment 5

Figure 14:
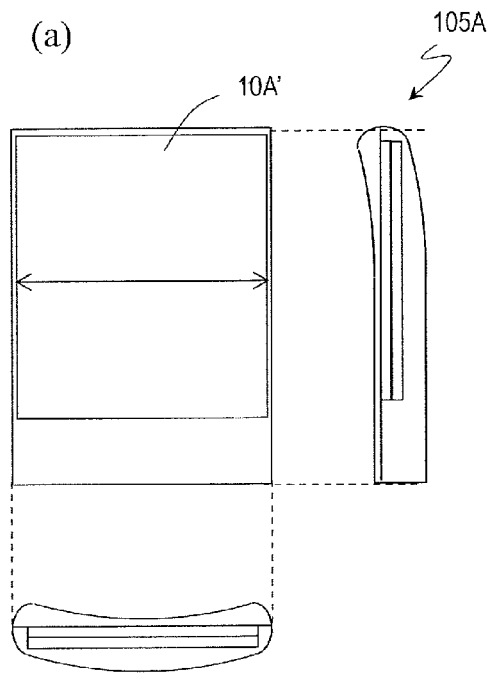
FIG. 14 (*a*) shows a front view, a side cross-sectional view, and an end cross-sectional view of an implementation where convex lens portions are provided on three sides of the electronic device; and (*b*) shows a front view, a side cross-sectional view, and an end cross-sectional view of an implementation where convex lens portions are provided on four sides of the electronic device.
Figure 14:
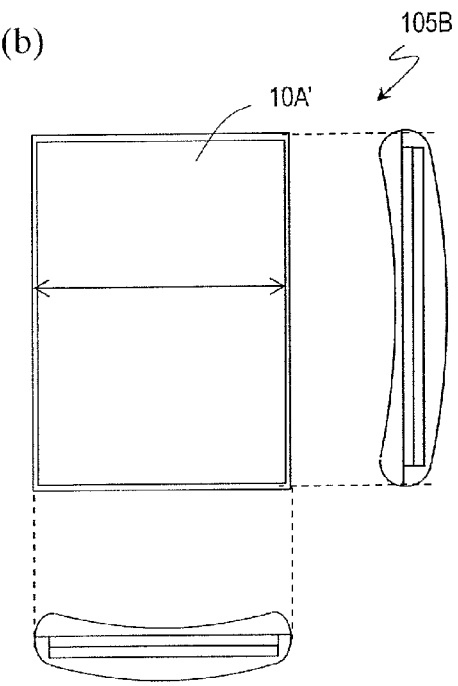

FIGS. 14(a) and (b) show electronic devices 105A and 105B according to Embodiment 5. Although Embodiments 1 to 4 above illustrate examples where the concave curved surface defining the manipulation surface of the touch panel is the side face of a cylinder, it may also be a curved surface having curvature along a plurality of directions on the panel plane, as in the present embodiment. Moreover, as has been described with respect to Embodiment 3, without being limited to a construction where convex lens surfaces are provided at the two sides of right and left of the electronic device 103, convex lens surfaces may be provided at three sides as shown in FIG. 14(a), or convex lens surfaces may be provided at four sides as shown in FIG. 14(b). In this manner, the apparent display region 10A' can be further enlarged.

In shapes with convex lens surfaces at three or more sides, it is preferable that the curved surfaces at corner portions each constitute a part of the surface of a body of revolution, so that light from the pixels will be refracted in appropriate directions. Such an instance is described in International Publication No. 2010/070871, for example. The entire disclosure of International Publication No. 2010/070871 is incorporated herein by reference.

Although electronic devices according to embodiments of the present invention have been described above, it will be appreciated that various modifications are possible. For example, the electronic device does not need to be shaped as a rectangular plate, but may be shaped as a disk. In this case, too, by choosing the manipulation surface of the touch panel to be an appropriate concave curved surface with a dented central portion, manipulability is improved while suppressing erroneous manipulations. Moreover, in electronic devices having a touch panel which is disposed at the back of the display device (a so-called rear touch panel), too, adopting a concave curved surface as the manipulation surface of the touch panel can improve manipulability and prevent erroneous manipulations at the back of the display plane.

INDUSTRIAL APPLICABILITY

Electronic devices according to an embodiment of the present invention can be widely used in mobile electronic terminals such as smartphones and digital audio players.

REFERENCE SIGNS LIST 10 display device
10A display region
10F frame region
12 touch panel
22A manipulation region (manipulation surface)
14 multilayer structure
20 housing
22 front plate
100 electronic device

The invention claimed is:

1. An electronic device having a multilayer structure including a touch panel and a display device,
   the electronic device comprising a manipulation surface configured to accept an input from a user, the manipulation surface being provided on a surface of the electronic device closer to the touch panel,
   the manipulation surface includes a curved surface such that a central portion of the manipulation surface is dented relative to an end of the manipulation surface, wherein
   a most-dented portion of the manipulation surface is dented by a distance of not less than 0.2 mm and not more than 3.0 mm relative to an end of the manipulation surface along a direction perpendicular to the panel plane,
   the curved surface includes a curve with a radius of curvature of not less than 50 mm and not more than 500 mm, and
   the surface of the electronic device includes an unmanipulable region which does not permit touch panel manipulation, the unmanipulable region spanning at least about 5 mm or more from each end of the electronic device.

2. The electronic device of claim 1, wherein,
   the electronic device has an outer shape of a rectangular plate; and
   the electronic device has a width of not less than 40 mm and not more than 70 mm and is configured to be manipulable by the user with one hand.

3. The electronic device of claim 1, wherein the display device is plate-shaped.

4. The electronic device of claim 1, wherein,
   the touch panel is disposed on a viewer's side of the display device; and
   the manipulation surface is provided on a light-transmitting front plate, the light-transmitting front plate being disposed so as to constitute the surface closer to the touch panel.

5. The electronic device of claim 4, wherein,
   the display device is plate-shaped; and
   the light-transmitting front plate is made of an acrylic resin, and includes a portion with a thickness greater than 1.7 mm on a display region of the display device.

6. The electronic device of claim 4, wherein,
   the display device is plate-shaped; and
   the light-transmitting front plate is made of glass, and includes a portion with a thickness greater than 2.7 mm on a display region of the display device.

7. The electronic device of claim 4, wherein the light-transmitting front plate includes a convex lens portion disposed so as to cover a peripheral display region and a frame region of the display device.

8. The electronic device of claim 7, wherein the light-transmitting front plate further includes a flat portion provided outside the convex lens portion.

9. The electronic device of claim 7 satisfying $3.0 \leq Y/X \leq 4.2$, where X is a width of a non-display region including the frame region; and Y is a distance from a light-outgoing surface of a display element of the display device to a lens vertex of the convex lens portion along a panel normal direction.

10. The electronic device of claim 4, wherein a thickness of the light-transmitting front plate in the unmanipulable region is greater than a thickness of the light-transmitting front plate at the manipulation surface.

11. The electronic device of claim 1, wherein a touch sensitivity at the end of the manipulation surface is lower than a touch sensitivity at the central portion of the manipulation surface.

12. The electronic device of claim 1, wherein a distance from a display region of the display device to an outer end face of the electronic device is not less than 3 mm and not more than 5 mm.

13. The electronic device of claim 1, wherein the unmanipulable region partially overlaps with a display region of the display device.

* * * * *